US007825614B2

(12) United States Patent
Archdekin

(10) Patent No.: US 7,825,614 B2
(45) Date of Patent: Nov. 2, 2010

(54) VOLTAGE CONTROL LOAD CENTER, MODULAR VOLTAGE CONTROL TRANSFORMER CIRCUIT, AND METHOD OF MAKING AND USING

(76) Inventor: James M. Archdekin, 76 Mercantile Way, Ladera Ranch, CA (US) 92694

( * ) Notice: Subject to any disclaimer, the term of this patent is extended or adjusted under 35 U.S.C. 154(b) by 486 days.

(21) Appl. No.: 11/725,871

(22) Filed: Mar. 20, 2007

(65) Prior Publication Data
US 2007/0224905 A1    Sep. 27, 2007

Related U.S. Application Data

(60) Provisional application No. 60/784,351, filed on Mar. 21, 2006.

(51) Int. Cl.
*H05B 37/02* (2006.01)
(52) U.S. Cl. .................... 315/313; 315/276; 315/307
(58) Field of Classification Search ............ 315/291, 315/307, 308, 276–282, 309, 313, 320
See application file for complete search history.

(56) References Cited

U.S. PATENT DOCUMENTS 7,084,587 B2 * 8/2006 Archdekin et al. .......... 315/309

* cited by examiner

*Primary Examiner*—David Hung Vu
(74) *Attorney, Agent, or Firm*—Terry L. Miller

(57) ABSTRACT

A voltage control load center (10) includes plural modular voltage control transformer circuits (20), and is connected between supply mains (22) and a load (L) including one or more high intensity discharge (HID) lamps. The lamps are started at full line voltage, and after a sufficient operating interval ensuring that the lamps have achieved a sustaining temperature, the operating voltage applied to the lamps is reduced, effecting a considerable savings in energy use, with little or an acceptably small decrease in illumination provided by the lamps. Because the voltage control transformer circuits (20) are modular, voltage control load centers (10) suitable for a variety of differing requirements may be quickly, easily, and inexpensively fabricated and installed without the need for the conventional requirement of a custom (i.e., application specific) transformer design and fabrication, which conventional requirements are both time and labor intensive.

9 Claims, 4 Drawing Sheets

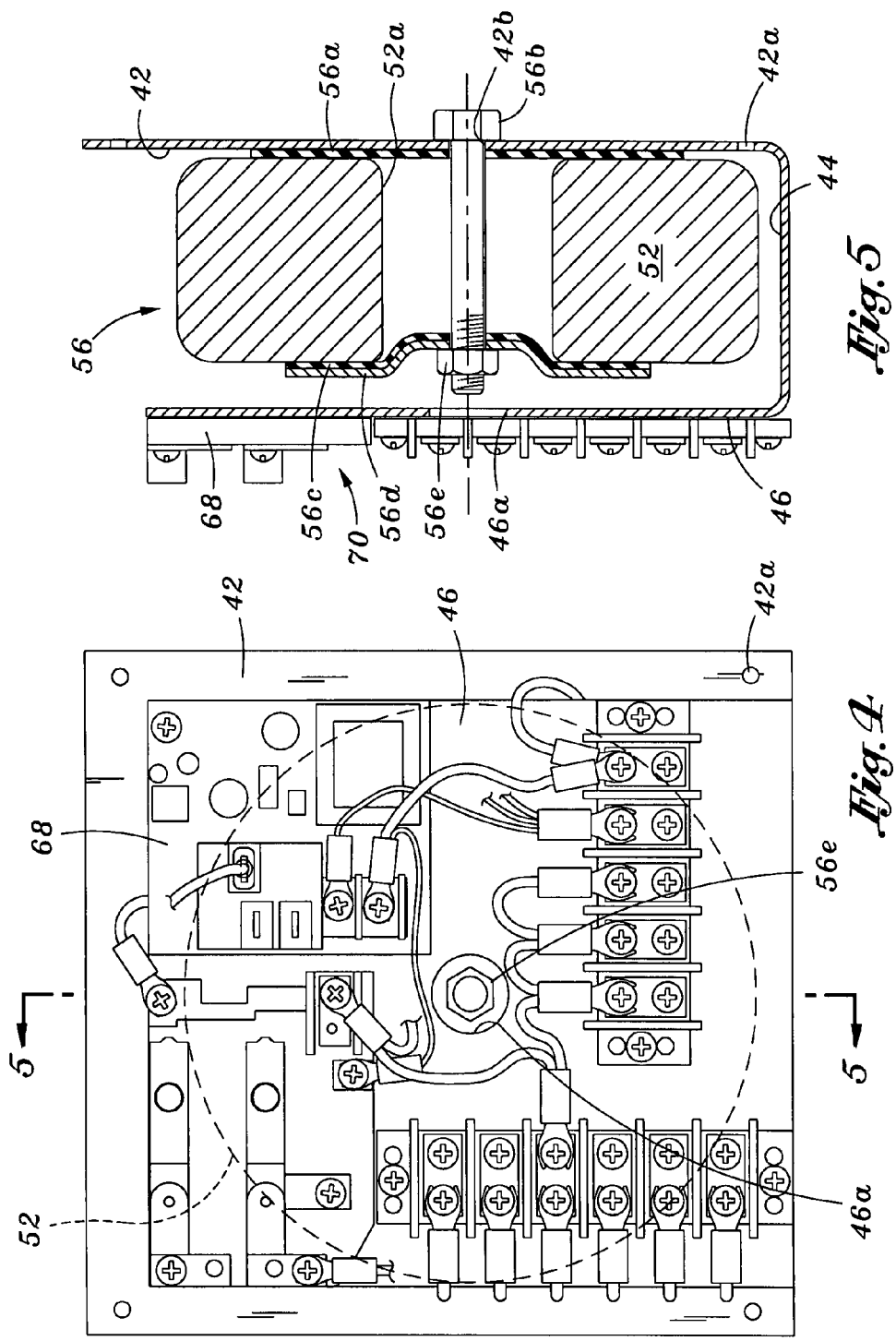

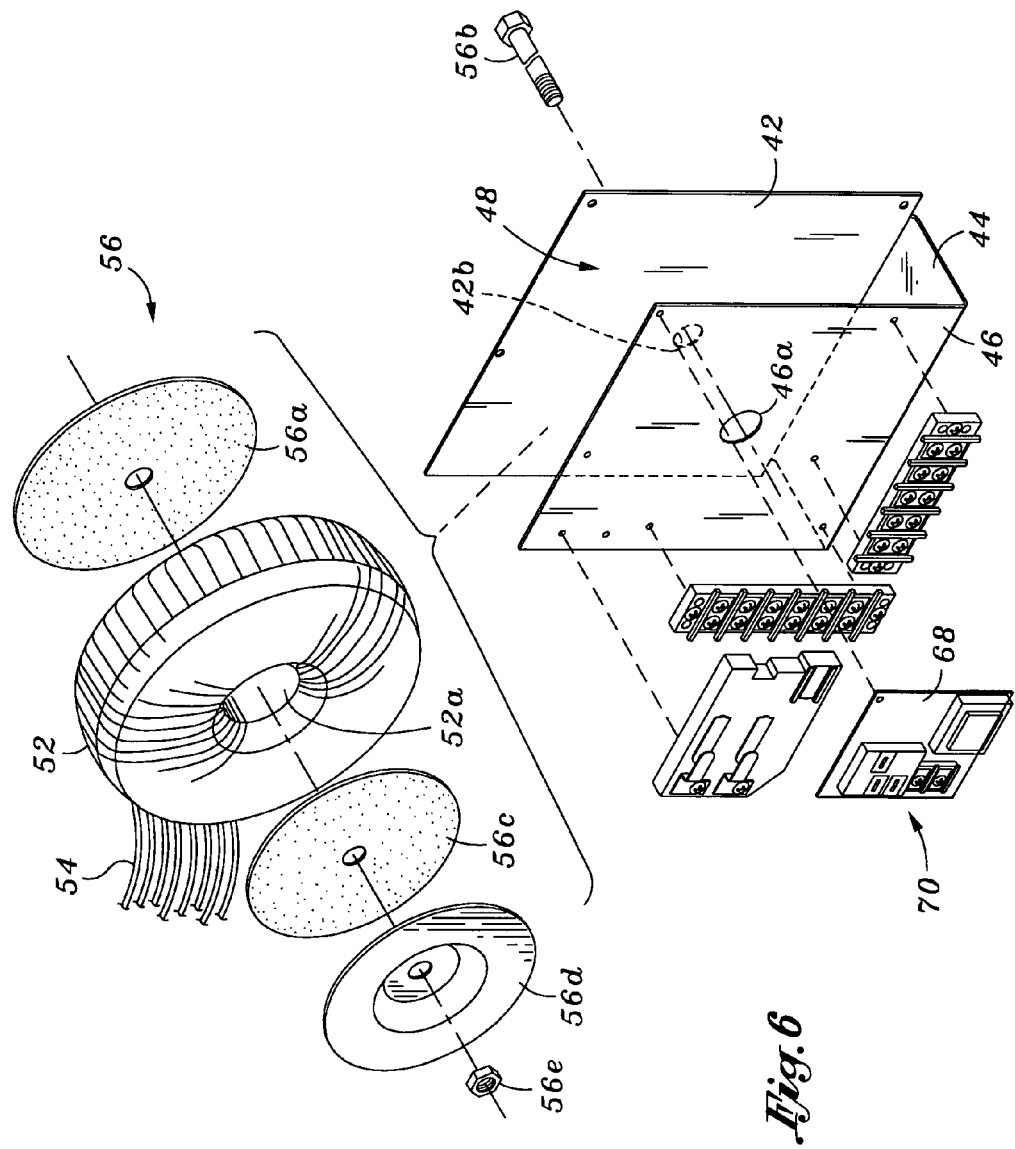

VOLTAGE CONTROL LOAD CENTER, MODULAR VOLTAGE CONTROL TRANSFORMER CIRCUIT, AND METHOD OF MAKING AND USING

CROSS REFERENCE TO RELATED APPLICATION

This application is related to, and claims benefit of and priority under 35 USC §119(c) from U.S. provisional application No. 60/784,351, filed 21 Mar. 2006.

BACKGROUND OF THE INVENTION

1. Field of the Invention

The present invention, broadly considered, is in the field of lighting control. More particularly, the present invention pertains to a voltage control load center for control of the voltage applied to high intensity discharge lamps. The voltage control load center includes plural modular transformer circuits, each controlling the voltage applied to an HID lamp or group of such lamps. Further, this invention relates to such a modular voltage control transformer circuit, and to methods of making and using both the voltage control load center and the modular transformer circuit.

2. Related Technology

The present invention constitutes an improvement over prior art U.S. Pat. No. 4,431,948, issued Feb. 14, 1984, and also over U.S. Pat. Nos. 5,528,110; 5,508,589; and 5,623,186, the disclosures of which are incorporated herein by reference to the extent necessary for a full disclosure and understanding of the present invention.

The '948 patent discloses a controller for HID lighting effecting a selective reduction of applied voltage by use of an autotransformer connected in series with a switch. A first portion of the autotransformer winding is interposed between the input and the output, and an additional winding portion is interposed between the output and the common or neutral terminal of an alternating current power source. The first portion of winding is referred to the series winding of the autotransformer, and the second portion of the winding is referred to as the common winding of the autotransformer. The switch (which may be implemented as a relay, for example), is connected in series with the common winding so that when the relay is in its open condition, no current flows in the common winding, and the output voltage is substantially equivalent to the input voltage.

On the other hand, according to the '948 patent, when the switch contacts of the relay are closed current is permitted to flow in the common winding and the autotransformer performs its normal function with the output voltage reduced relative to the input voltage. However, the invention of the '948 patent has significant deficiencies, as is pointed out in the three later patents identified above.

In the three later patents identified above, an inventive autotransformer is provided with a bucking coil in order to cancel the creation of harmonics and inadvertent heating affects in the autotransformer. This inventive autotransformer avoids the deficiencies of the '948 patent. However, further improvements to the technology for controlling HID lighting are possible. There is, therefore, a need to provide an improved apparatus and method for control of HID lighting in order to achieve lowered power consumption.

All prior voltage control transformer circuits known to the Applicant were designed for specific applications, and were sized for those applications. Thus, each application or installation of such a voltage control transformer circuit for HID lighting was to a greater or lesser extent a custom design and a custom (i.e., application specific) installation.

However, it is desirable to make the advantages of voltage controlled HID lighting, and the energy savings that can be realized from the use of such lighting, widely available to the public. Thus, it would be an advantage to have a voltage control transformer circuit for HID lighting that was modular in a convenient size (i.e., convenient wattage).

Further, it would be an advantage to have a voltage control load center for HID lighting which provided for plural such modular voltage control transformer circuits to be arranged for convenient connection to existing or newly installed HID lighting units.

SUMMARY OF THE INVENTION

In view of the deficiencies of the related technology, it is an object for this invention to reduce or eliminate at least one of these deficiencies.

Particularly, it is an object of this invention to provide a modular voltage control transformer circuit.

A further object of this invention is to provide a voltage control load center for HID lighting, which allows for the installation of plural such modular voltage control transformer circuits, and for their convenient connection to HID lighting units.

Accordingly, one particularly preferred embodiment of the present invention provides a modular voltage control transformer circuit.

Another particularly preferred embodiment of the present invention provides a voltage control load center including plural modular voltage control transformer circuits.

And further, the present invention provides the inventive method of utilizing a modular voltage control transformer circuit to control operating voltage applied to an HID lamp.

These and other objects and advantages of the present invention will be more fully understood from a consideration of the following disclosure of particularly preferred exemplary embodiments of the invention, taken in conjunction with the appended drawing Figures.

BRIEF DESCRIPTION OF THE DRAWINGS

FIGS. 4 and 5, respectively, are a side elevation view and a front elevation view of a modular voltage control transformer circuit according to the present invention;

FIG. 6 provides an exploded perspective view of a modular voltage control transformer circuit as seen in FIGS. 2-6.

DETAILED DESCRIPTION OF PREFERRED EXEMPLARY EMBODIMENTS

Figure 1:
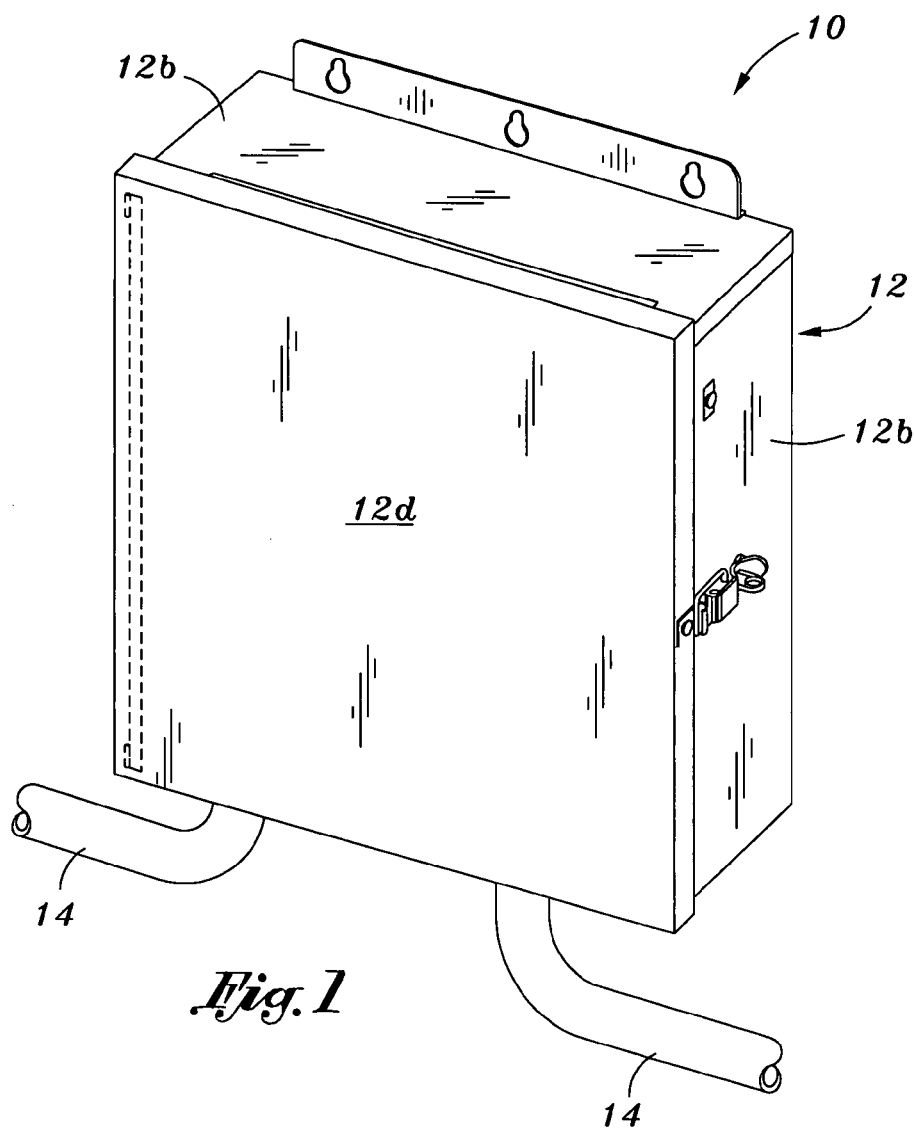
FIG. 1 provides an exterior perspective elevation view of a voltage control load center, which includes plural modular voltage control transformer circuits for HID lighting.
Figure 2:
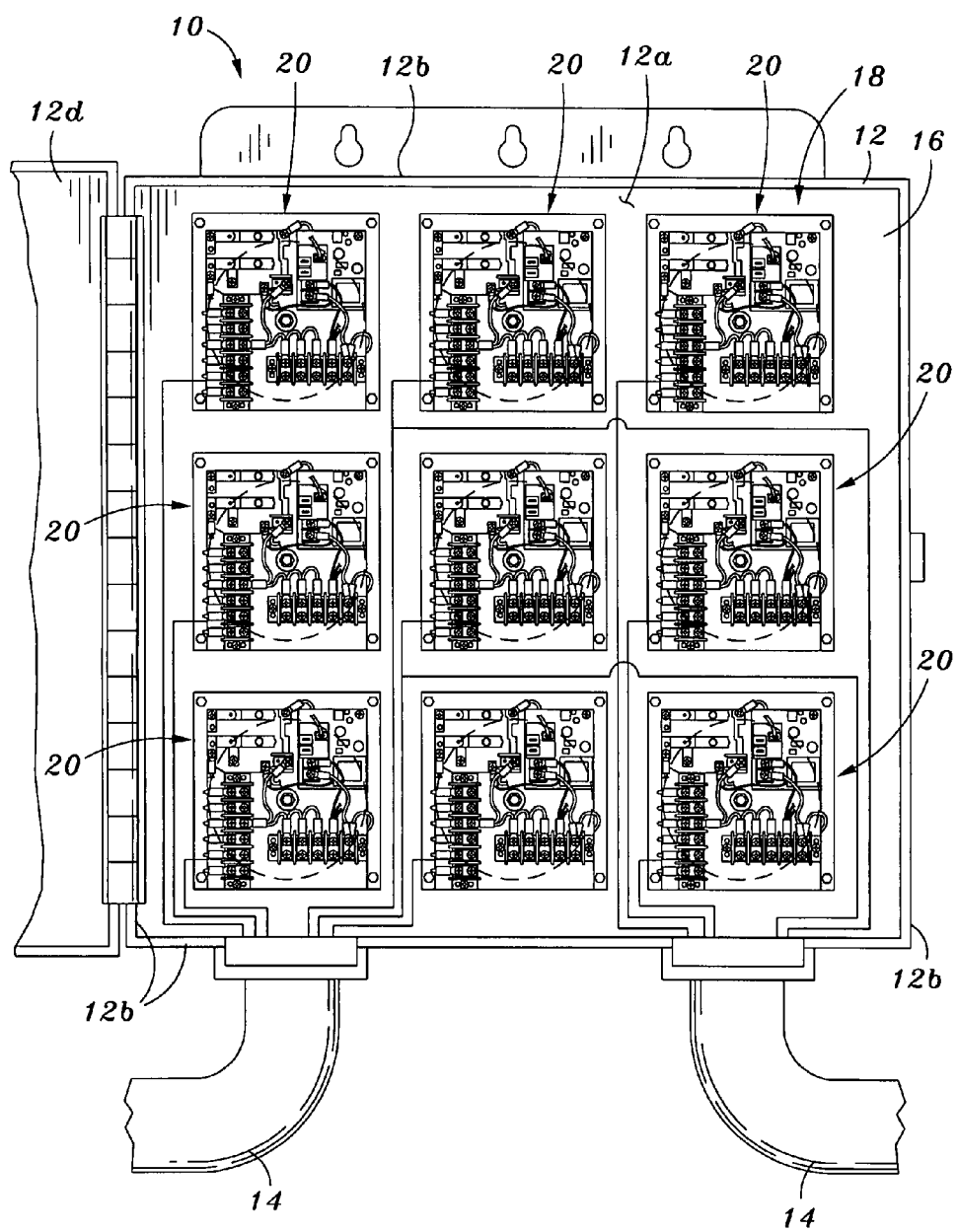
FIG. 2 provides a elevation view of the voltage control load center seen in FIG. 1, with the door of the load center opened (and partially broken away for convenience of illustration), to show the plural modular voltage control transformer circuits disposed in this load center.

Referring to FIGS. 1 and 2 in conjunction, a voltage control load center 10 includes a protective metal box or enclosure 12. This box 12 is most usually mounted to a wall (not seen in the drawing Figures), and has plural electrical conduits 14 (each housing electrical wiring) connecting thereto. The box 12 includes a rear portion 12a with peripheral walls (i.e., top, bottom, and side walls) each indicated with the numeral 12b, and a rear wall 12c (best seen in FIG. 2). A cover 12d (or front wall of the box 12) is hingeably or removably attached to the rear portion 12a. In FIG. 2, the cover 12d is shown hinged open (and partially broken away for convenience of illustration). As FIG. 2 illustrates, the box 12 encloses a volume, referenced with the numeral 16. Received within the box 12, in the volume 16, is an array 18 of plural modular voltage control transformer circuits (MVCTC's), each indicated individually with the numeral 20. Because each of the MVCTC's is essentially identical, description of one of these circuits will suffice to describe them all. As is best seen in FIG. 2, these MVCTC's are connected to wiring entering the box via the conduits 14. As will be further explained, each of the MVCTC's 20 includes a terminal strip to which certain ones of the wires are connected, as will be better understood in view of the following description.

Figure 3:
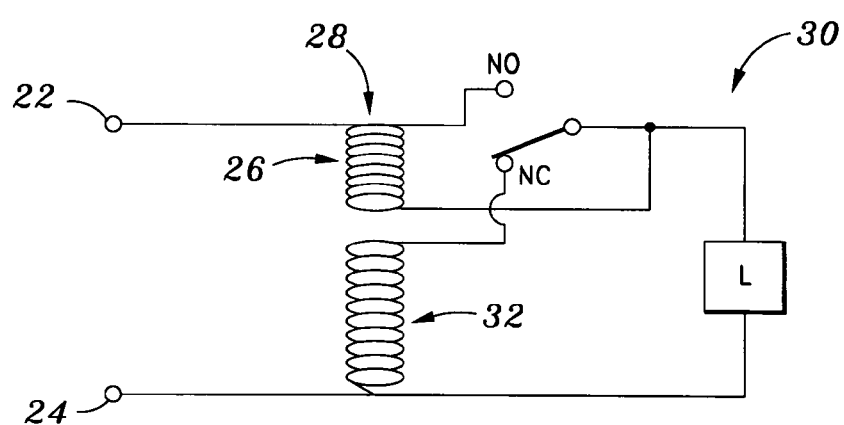
FIG. 3 is a simplified schematic of a portion of the modular voltage control transformer circuit.

FIG. 3 provides a simplified schematic of the circuit defined by a supply line (i.e., from the AC power mains) in combination with one of the MVCTC's 20, and in combination with a load, which is most preferably a high intensity discharge (HID) lamp (or a group of such HID lamps). Viewing FIG. 3, it is seen that the line voltage is received over two wires, indicated with numerals 22 and 24 (with 22 being the line, and 24 being common). In order to proved an initial understanding of the voltage control load center 10, attention now to FIG. 3, will show that wire 22 is connected to one side of the primary (i.e., series) winding 26 of a transformer 28. The other side of this transformer winding 26 is connected to an HID lighting unit, indicated with the character "L" standing for "load." The other connection of the HID lighting unit L is connected to the other wire 24. So, whenever line voltage is applied to the wires 22 and 24, the HID lighting unit L will receive voltage. However, the voltage level received by the HID lighting unit L is controlled by the operation of the MVCTC 20, and particularly is controlled by the operation of transformer 28.

It is seen that the MVCTC 20 illustrated in FIG. 3 includes a single-pole, double-throw (SPDT) switch 30 having a common contact connecting to the other side of the winding 26, and to the lighting unit L. This SPDT switch 30 includes a normally open (NO) contact which is connected to the wire 22 and to the first end of primary winding 26. Similarly, the SPDT switch 30 includes a normally closed (NC) contact which is connected to one end of a secondary (i.e., parallel) winding 32 of the transformer 28.

The other end of this secondary winding 32 is connected to the wire 24, and to the other side of the load L.

So, those ordinarily skilled in the pertinent arts will recognize that when the SPDT switch 30 (which may preferably be provided as a relay) is not energized, and the NC contacts are closed, the transformer 28 functions as a conventional autotransformer, and delivers a reduced voltage to the lighting unit L. Viewed differently, when the NC contacts of SPDT switch (relay) 30 are closed, the relay 30 provides power from wire 22 to the first end of winding 32. The windings 26 and 32 are magnetically coupled (i.e., as is common in transformers), and the winding 32 is arranged to buck or resist or to decrease (as opposed to boosting) the voltage across winding 26. Consequently, the load L receives a voltage which is less than the voltage applied to the mains on wires 22 and 24. On the other hand, when the NO contacts of this relay 30 are closed, then the relay shorts the primary winding 26, but delivers full voltage from wire 22 to the lighting unit L. When the NC contacts of the relay 28 or 30 are closed a reduced voltage level delivered to the lighting unit L will be a ratio of line voltage generally according to the turns ratio of winding 32 compared to the total turns of windings 26 and 32 together. And, importantly, because of the configuration of the circuit seen in FIG. 3, the transition from full voltage applied to lighting unit L, to a reduced voltage applied to this lighting unit, occurs without an interruption of current flow to the lighting unit. Thus, there is no tendency for the HID lighting unit L to be extinguished because of even a temporary interruption of current flow. Current flow is continuous during the voltage reduction desired after warm up of the HID lighting unit L.

Now, in order to provide for full voltage starting of the HID lighting unit L, followed by a sufficient warm up interval of operation at full voltage in order to insure that the lighting unit L can remain lighted when voltage level is reduced for sustained operation, a timing device is most preferably utilized, and is programmed or selected to provide a sufficiently long warm up interval that the HID lighting unit (i.e., load L) will have achieved sustaining temperature so that the unit does not extinguish when the applied operating voltage is reduced. This time interval may be a variable, depending on such facts as the extent of the voltage reduction (and energy savings) desired, and the ambient temperature where the HID lamps are located.

Considering now FIGS. 4-6 in conjunction, it is seen that the modular voltage control transformer circuit (MVCTC) 20 includes a base 40, which is generally rectangular or square in front view, and is U-shaped in side view. The base 40 includes a generally rectangular back plate portion 42, which defines mounting holes 42a by which the MVCTC 20 can be secured to the back wall 12a of box 12 and within the volume 16. From this back plate portion 42, a connecting leg portion 44 extends forwardly to carry a front plate portion 46. Cooperatively, the back plate portion 42, connector leg portion 44, and front plate portion 46 define a recess 48, (best seen in FIG. 6). An annular or torroidal transformer assembly 50 is receivable into the recess 50. This assembly includes a transformer core and windings 52 having a central passage 52a, plural leads 54, and a mounting assembly, generally indicated with the numeral 56 on FIG. 6.

Viewing FIG. 6, it is seen that the mounting assembly 56 includes a rear cushion member 56a, (which is elastomeric and insulating) is interposed between the rear plate portion 42 and the transformer 52. As is best seen in FIG. 6, the rear plate portion 42 defines a centrally located bolt hole 42b, and a bolt 56b is received through this hole 42b to receive the cushion member 56a. Next, the transformer core 52 is received over the bolt 56b, followed by another cushion member 56c (which is also elastomeric and insulating), a dimpled washer member 56d, and a nut 56e to secure these components in place. It is seen that the dimpled washer 56d includes a central conical offset 56d', which is sized to be received into the central passage 52a of the annular transformer 52. As is best seen in FIG. 6, but visible also in FIGS. 4 and 5, the front plate portion 46 defines a centrally located opening 46a aligned with the bolt hole 42b, and by which access to the nut 54e is facilitated in order to effect secure mounting of the transformer 52 within the recess 48. Thus, the transformer 52 is supported by rear plate portion 42, but is received into recess 48 so that the leads 54 are easily accessed at the front plate portion 46.

As FIGS. 4-6 illustrate, these leads from transformer 52 are trained around the edge of front plate portion 46, and are there secured to a connector strip 60 carried on the front plate portion 46. This connector strip 60, and a second connector strip 62 also carried on the front plate portion 46, provide for connection of electrical wiring to the MVCTC 20, as was generally illustrated and described by reference to FIG. 2. Also carried on the front of front plate portion 46 is a control circuitry for the MVCTC 20, and which is generally referenced with the numeral 64. This control circuit 64 includes a relay 66, which provides the SPDT switch 30 explained with reference to FIG. 3. That is, the relay 66 includes a set of Normally Open (NO), and a set of Normally Closed (NC) contacts which operate as explained above to change the voltage provided to a load connected to the MVCTC 20. Also carried on the front plate portion 46 on a circuit board 68 is a timing circuit 70 controlling operation of the relay 66. That is, the timing circuit 70 is arranged to start a count-down time interval when power is applied to the MVCTC 20, and to accordingly operate the load (i.e., HID lamps connected to the MVCTC 20) at full line voltage for a determined time interval after the power is turned on. So, the HID lamps will start and operate at full line voltage for this determined time interval, ensuring that the lamps are sufficiently hot that they do not extinguish when the applied voltage is decreased by the MVCTC 20. After this time interval, the MVCTC 20 operates relay 66 to result in the voltage applied to the HID lamps being reduced to a level lower than full line voltage. This results in little or only an acceptably small reduction in light output from the HID lamps, but results in a significant energy savings.

As a result, when the HID lighting units connected to MVCTC 20 are started at full line voltage, and are thereafter provided with a period of operation at full line voltage during which the lighting units warm from ambient temperature to achieve a temperature sufficient to sustain operation at a reduced voltage level, the timing circuit 70 conducts a count-down of the determined time interval. The time interval is selected such that the lighting units are sufficiently hot to sustain operation at reduced voltage.

In view of the above, it is apparent that the present invention is not limited to the precise details of the preferred exemplary embodiments depicted, described, and disclosed above. Instead, this invention is intended to be limited only by the sprit and scope of the appended claims, giving full cognizance to equivalents.

I claim:

1. A modular voltage control transformer circuit for controlling the operating voltage level applied to an HID lighting unit, said modular voltage control transformer circuit including a base carrying a transformer, and a panel carrying a SPDT switch in a first position connecting full line voltage to said HID lighting unit for starting of said lighting unit, and in a second position said SPDT switch connecting a reduced voltage less than full line voltage to said HID lighting unit for sustained operation of said lighting unit, and a timing circuit effecting switching of said SPDT switch from said first to said second position after passage of a determined start-up time interval of full line voltage operation;

wherein said circuit comprises:
a base which is generally rectangular in front view and U-shaped in side view; said base including a generally rectangular back plate portion which defines mounting holes by which the modular voltage control transformer circuit can be secured within an enclosure; said base further including a connecting leg portion extending forwardly to carry a front plate portion;
a recess cooperatively defined by the back plate portion, connecting leg portion, and front plate portion receiving a transformer assembly including a transformer core and windings;

further including:
a mounting assembly having a rear cushion member which is elastomeric and insulating and is interposed between said rear plate portion and said transformer;
said rear plate portion defining a centrally located bolt hole, and a bolt received through this hole to receive the cushion member;
said transformer core being received over said bolt, and another cushion member which is also elastomeric and insulating and sandwiching said transformer;
a dimpled washer member and a nut securing said another cushion member, said transformer, and said rear cushion member onto said rear plate portion.

2. The modular voltage control transformer circuit according to claim 1 further including leads from said transformer trained around an edge of said front plate portion;
a connector strip carried on said front plate portion;
a second connector strip also carried on said front plate portion;
a control circuitry for the modular voltage control transformer circuit carried on said front plate portion including a relay providing said SPDT switch by including a set of Normally Open (NO), and a set of Normally Closed (NC) contacts which operate in opposition to one another to change the voltage provided to said HID lighting unit;
a count down timing circuit controlling operation of said SPDT relay;
whereby a count-down time interval is started when power is applied to the modular voltage control transformer circuit such that HID lamps are started and operated at full line voltage for a determined time interval; and after this time interval, the modular voltage control transformer circuit operates said SPDT relay to reduce the voltage applied to the HID lamps to a level lower than full line voltage.

3. An HID lighting modular voltage control transformer circuit (MVCTC) for use in an HID lighting voltage control load center, said MVCTC receiving voltage and current from a power line and selectively providing either full line voltage or a selectively reduced voltage level to an HID lighting load with no interruption of current flow to the HID lighting load in response to change of voltage between full line voltage and said selectively reduced voltage level, said MVCTC including:
a transformer having an annular core, a primary winding on said core and a secondary windings on said core, said primary winding having two respective ends, and said secondary winding also having two respective ends, said ends of said primary winding individually connecting to respective terminals of a connector strip, and said ends of said secondary winding also individually connecting to respective terminals of a connector strip;
a single-pole, double-throw (SPDT) switch having a common contact connecting with a second of said two ends of said primary winding and to the HID lighting load, said SPDT switch including a normally open (NO) contact connecting to one side of the line and to a first end of said two ends of said primary winding; said SPDT switch including a normally closed (NC) contact connecting to a first end of said two ends of said secondary winding; a second end of said secondary winding connecting to the other side of the line and also connecting to the other side of said HID lighting load;
whereby, on the one hand when the SPDT switch NC contacts are closed, said transformer delivers a reduced voltage to the load with the secondary winding arranged to buck voltage across said primary winding; and on the other hand, when the NO contacts of said SPDT switch are closed said SPDT switch shorts said primary winding and connects full line voltage to said HID lighting load;

said MVCTC further comprising a base member carrying said transformer, said base member including a rear portion disposed at a rear side of said transformer and including provision for mounting said MVCTC within a protective enclosure, a leg portion extending from said base portion, and said leg portion carrying a front plate portion disposed on a front side of said transformer opposite to said base portion, and said connector strip being carried upon said plate portion.

4. The HID lighting MVCTC according to claim 3 wherein said base member is generally rectangular in front view and is U-shaped in side view, said base member including at said rear portion provisions for mounting said MVCTC including said rear portion being configured to attach directly to a back wall of a protective electrical enclosure, and by which rear portion the MVCTC is secured and supported within said protective electrical enclosure with said annular transformer core disposed generally parallel to both said rear portion and said back wall of said enclosure, and said connecting leg portion extending from said base portion generally perpendicular to said back wall and about a side of said annular transformer core to carry said front plate portion.

5. The HID lighting MVCTC according to claim 3 wherein said connector strip is carried upon said front plate portion, and said leads from said transformer first winding and second winding are trained about an outer edge of said front plate portion to connect with said connector strip.

6. The HID lighting MVCTC according to claim 3 wherein said protective electrical enclosure includes a rear wall portion, and plural peripheral wall portions cooperating with said rear wall portion to define a volume, and an opening to said volume, and a cover for closing said opening, said enclosure receiving electrical wiring including said power line, and plural modular voltage control transformer circuits (MVCTC's) received into said volume of said enclosure and connecting to said electrical wiring.

7. The HID lighting MVCTC according to claim 3 further including a pair of cushion members sandwiching said transformer, and said rear portion and said front plate portion cooperatively sandwiching said pair of cushion members with said transformer therebetween.

8. The HID lighting MVCTC according to claim 4 further including a bolt member passing through said transformer core and spanning between said rear portion and said front plate portion, said front plate portion defining an opening passing said bold member, and said bolt member carrying a dimpled or conical washer engaging said transformer to center said transformer at said front plate portion opening.

9. The HID lighting MVCTC according to claim 3 further including said front plate portion carrying a count down timer activated upon application of line voltage to said primary winding to count down a determined interval, and said countdown timer upon running of said determined interval switching said SPDT switch between a first position and a second position to switch voltage supplied to said HID lighting load from full line voltage to said selectively reduced voltage level with no interruption of current flow to said HID lighting load.

* * * * *